(12) United States Patent
Selsdon (10) Patent No.: US 7,459,079 B2
(45) Date of Patent: Dec. 2, 2008

(54) FILTER FOR FILTERING MUTAGENS FROM AN ENGINE OIL

(76) Inventor: Leslie Donald Selsdon, 41 Cumberland Court, Great Cumberland Place, Marble Arch, London (GB) W1H 7DQ ( * ) Notice: Subject to any disclaimer, the term of this patent is extended or adjusted under 35 U.S.C. 154(b) by 0 days.

(21) Appl. No.: 10/552,907

(22) PCT Filed: Apr. 9, 2004

(86) PCT No.: PCT/GB2004/001607

§ 371 (c)(1),
(2), (4) Date: Oct. 13, 2005

(87) PCT Pub. No.: WO2004/090083

PCT Pub. Date: Oct. 21, 2004

(65) Prior Publication Data

US 2006/0196818 A1    Sep. 7, 2006

(30) Foreign Application Priority Data

Apr. 14, 2003   (GB) ................................. 0308638.6

(51) Int. Cl.
*B01D 27/14*       (2006.01)
(52) U.S. Cl. .................... 210/266; 210/282; 210/416.5; 210/DIG. 17
(58) Field of Classification Search ................. 210/266, 210/416.5, DIG. 17, 282
See application file for complete search history.

(56) References Cited

U.S. PATENT DOCUMENTS

| 3,730,347 | A | * | 5/1973  | Giampalmi et al. | 210/282 |
| 3,836,005 | A | * | 9/1974  | Bauer            | 210/282 |
| 4,645,597 | A |   | 2/1987  | Wada             | 210/222 |
| 5,069,799 | A | * | 12/1991 | Brownawell et al.| 210/749 |
| 5,225,081 | A |   | 7/1993  | Brownawell       | 210/690 |
| 5,589,059 | A | * | 12/1996 | Semar            | 210/109 |
| 5,679,251 | A |   | 10/1997 | Swanson et al.   | 210/437 |

FOREIGN PATENT DOCUMENTS

EP            0 416 908           3/1991

* cited by examiner

*Primary Examiner*—Christopher Upton
(74) *Attorney, Agent, or Firm*—Iandiorio Teska & Coleman (57) ABSTRACT

A filter (2) for filtering mutagens from an engine oil, which filter (2) comprises a body (4), an inlet (12) for oil passing into the body (4), an outlet (14) for the oil passing out of the body (4), and a filter (2) material in the body (4) for filtering the oil as the oil passes through the body (4), and the filter (2) material being such that it comprises activated carbon (16) for removing the mutagens.

18 Claims, 8 Drawing Sheets

FILTER FOR FILTERING MUTAGENS FROM AN ENGINE OIL

This invention relates to a filter for filtering mutagens from an engine oil.

BACKGROUND OF THE INVENTION

New and unused engine oil generally does not contain any mutagens. As the oil is used in an engine, the effect of the length of use of the oil, the pressure at which the oil is used, the temperature at which the oil is used, and water cause the creation of mutagens. Many of these mutagens are toxic and they can cause fatal diseases such for example as cancer.

Known attempts to reduce the level of mutagens produced as engine oil is used, have simply been to recommend that engine oil is changed at frequent intervals, for example at 6,000 mile intervals. I have now established that recommended oil change intervals are too long and toxic levels of mutagens will be present in the engine oil long before recommended oil changes. In addition, engine manufacturers are constantly striving towards producing engines that require oil changes at longer intervals rather than shorter intervals.

It is an aim of the present invention to obviate or reduce the above mentioned problem.

BRIEF SUMMARY OF THE INVENTION

Accordingly, the present invention provides a filter for filtering mutagens from an engine oil, which filter comprises a body, an inlet for oil passing into the body, an outlet for oil passing out of the body, and a filter material in the body for filtering the oil as the oil passes through the body, and the filter material being such that it comprises activated carbon for removing the mutagens and a retainer material for retaining the activated carbon in place, the activated carbon is activated particulate carbon, the activated carbon is separate from and not integrally formed with the retainer material, the activated carbon has substantially its entire surface available for contact with the oil, the retainer material is a water-absorbent material, and the retainer material is in the form of a plurality of radially extending adjacent layers or pieces with the activated carbon between the layers or pieces wherein the activated carbon extends radially to a depth defined by the layers or pieces.

The provision of a filter for filtering the mutagens from the engine oil is of very substantial benefit. More specifically, the mutagens can be filtered from the engine oil as they are created. The filtered mutagens can be retained in the filter where they will cause minimum health problems. The activated carbon is a substance having large molecules and these large molecules are able to trap the mutagens. In addition, the activated carbon is a relatively cheap material, and one that is able to be achieved from natural sources. Thus the activated carbon itself is inexpensive to use so that it is able to meet commercial considerations, and the carbon is safe to use so that it is able to meet health and safety considerations. Thus the filter of the present invention is able to solve a considerable health problem in a cheap and failsafe manner. After use, the filter with the mutagens can be destroyed, for example by burning or any other suitable and appropriate method.

The filter of the present invention may be one which is simply for filtering the mutagens from the engine oil. Alternatively, the filter may be a multi-purpose filter for generally filtering the oil as it is used. If desired, the filter may be a multi-purpose filter for firstly filtering the mutagens from the engine oil, secondly for filtering the oil in a general manner, and thirdly for filtering the oil of any water in the oil. In this latter instance, the part of the filter that filters water from the oil may be effected by the use of a foam material such for example as a woven foam material or a polymer foam material. Where the foam material is a woven foam material, then this woven foam material may also be a polymer foam material.

Preferably, the filter is one in which the activated carbon is fine particle activated carbon. Such fine particle activated carbon provides a large active surface area for filtering the mutagens.

Preferably, the activated carbon is 44 micron activated carbon. The activated carbon may be smaller or larger is size than 44 micron. Generally, increasing the micron size of the activated carbon reduces the active surface area. Reducing the size of the activated carbon may make the activated carbon of such a small particulate size that special handling is required.

The retainer material may be a woven foam material and/or a polymer foam material.

The retainer material may be an absorbent fibre material. A preferred absorbent fibre material is a polyacrylate super absorbent fibre material. Such a polyacrylate super absorbent fibre material is made by Technical Absorbents Limited of Grimsby, United Kingdom under the name Oasis. The absorbent fibre material may be in the form of a non-woven material, a yarn material or a woven material.

The filter may be one in which the filter material forms part of a cartridge which is positioned in the body. The cartridge may be a disposable cartridge which then enables the cartridge to be removed from the filter and destroyed, for example by burning, as and when required.

The cartridge may include a support member for the filter material.

The support member may have a plurality of apertures along its length for enabling the oil to pass through the support member.

In one embodiment of the invention, the foam material is positioned around the outside of the support member. In this embodiment of the invention, the foam material is preferably in sheet form and it is wrapped around the outside of the support member.

In an alternative embodiment of the invention, the foam material is positioned inside the support member. In this case, the foam material may be in sheet form or in the form of pieces. The filter may include end screen members for retaining the foam material in the support member.

The filter of the present invention may be used with substantially all engines such for example as petrol engines, liquid petroleum gas (LPG) engines and diesel engines. The engines may form part of moving vehicles such for example as road vehicles in the form of cars, lorries, buses and motor cycles. Alternatively the engines may be in the form of tractors or earth moving equipment. The engines may also be in static equipment such for example as electrical generators and pumps.

Where the filter uses replaceable cartridges, then new cartridges can simply be placed in the body of the filter. If desired, a pack may be sold with the filter comprising the body, the inlet and the outlet, and a plurality of the disposable cartridges for use in the same body. If desired however the cartridge could be a permanent cartridge.

The filter may include a non-return valve. The non-return valve may be positioned in an end part of the filter.

The filter of the present invention may be of any suitable and appropriate construction. The body of the filter may be made of a plastics material. Any suitable and appropriate plastics materials may be employed. The plastics materials may be transparent for see-through purposes, or non-transparent. The body of the filter may also be made of a metal.

The filter may be one having a separate inlet and outlet. The separate and outlet are preferably formed for push-on hose connections held in place by clips such as jubilee clips. Other formations may be employed so that, for example, the separate inlet and outlet may be for receiving screw fittings or snap fittings. The filter may alternatively have a single combined inlet and outlet, and such a filter may be one in which the combined inlet and outlet is an internally threaded aperture for enabling the filter to be a screw threaded connection to an oil circuit.

It may be advantageous to know when the filter is blocking or a system containing the filter is blocking, this being especially so when the filter is a multi-purpose filter for generally filtering engine oil in addition to filtering the engine oil of the mutagens. Pressure sensing means such for example as a pressure differential gauge can be utilised so that a user can constantly monitor conditions.

The filter can be made in a wide variety of shapes. This can be advantageous in enabling the filter to be made in a shape, for example a star shape, that gives an oil cooling function. With such a shape, the filter can act as an oil cooler. With sufficient oil cooling from the filter, hitherto used radiators could be reduced in size or even dispensed with.

BRIEF DESCRIPTION OF THE SEVERAL VIEWS OF THE DRAWINGS

Embodiments of the invention will now be described solely by way of example and with reference to the accompanying drawings in which.

DETAILED DESCRIPTION OF THE INVENTION

Referring to FIGS. 1-5, there is shown a filter 2 for filtering mutagens from an engine oil. The filter 2 comprises a body 4 which is in two parts and comprises a base 6 and a cap 8. The cap 8 has a screw threaded portion 10 for screwing into the base 6.

Figure 1:
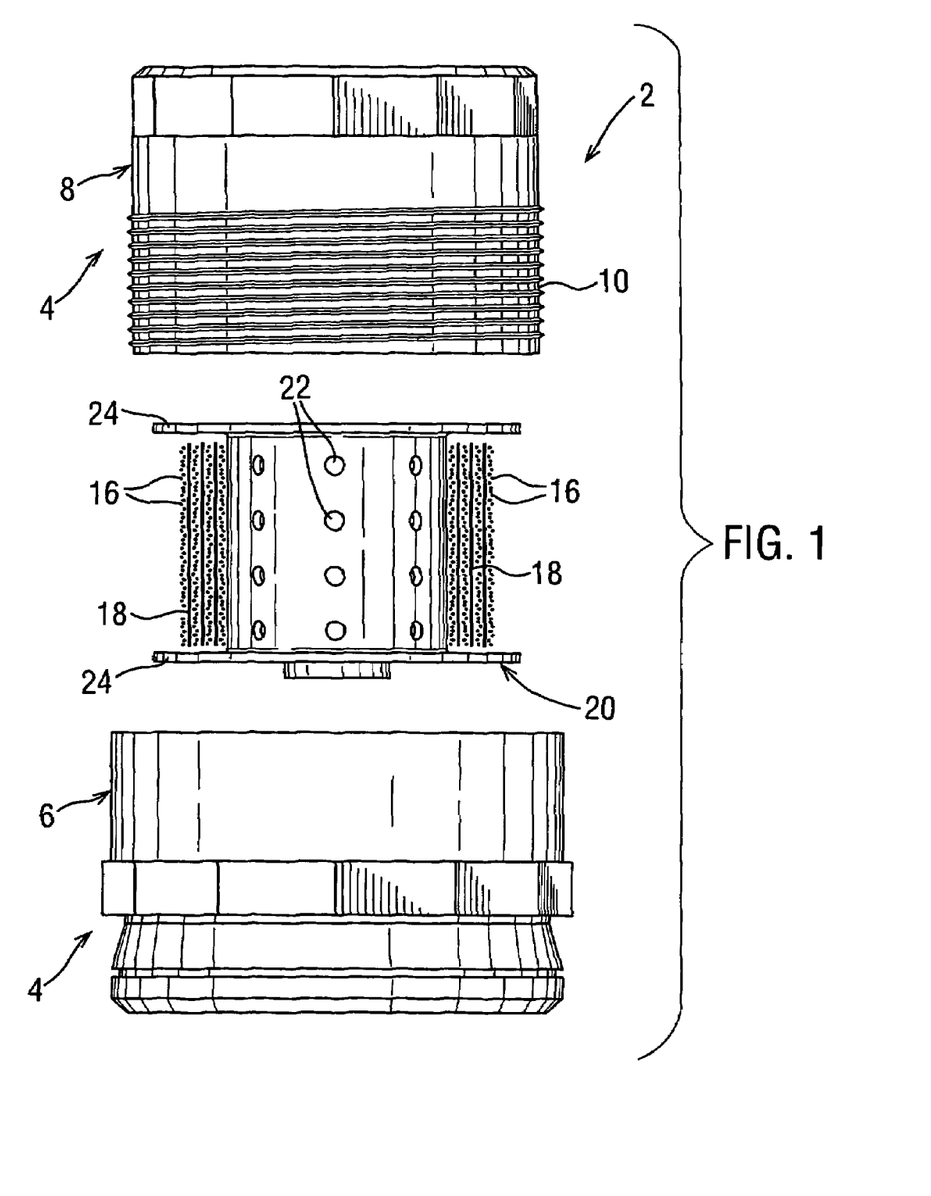
FIG. 1 is an exploded view of a first oil filter.
Figure 2:
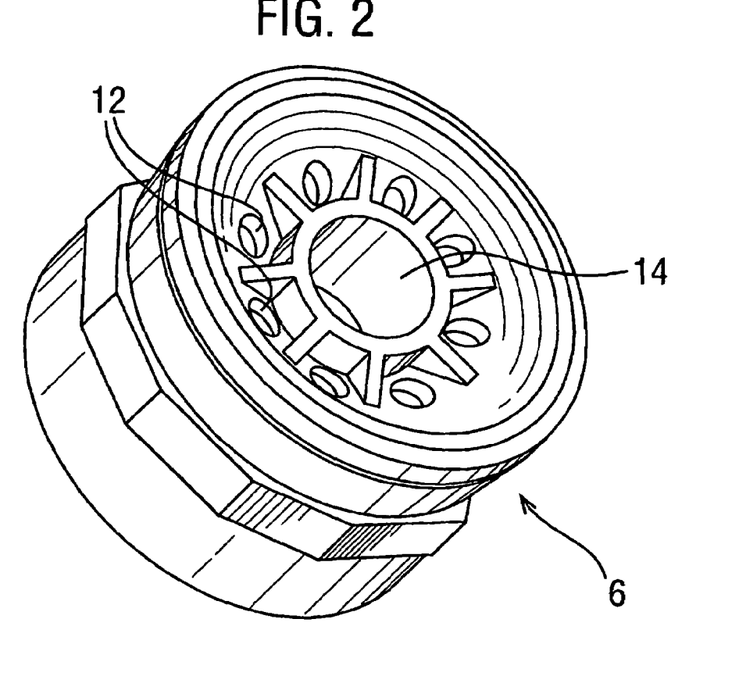
FIGS. 2 and 3 are perspective and end views of a base part of the filter shown in FIG. 1.
Figure 3:
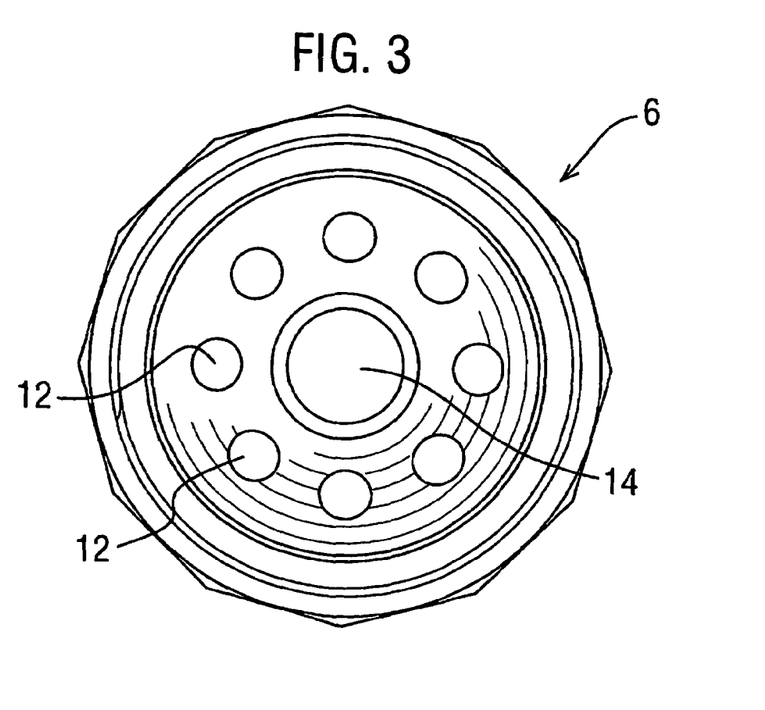
Figure 4:
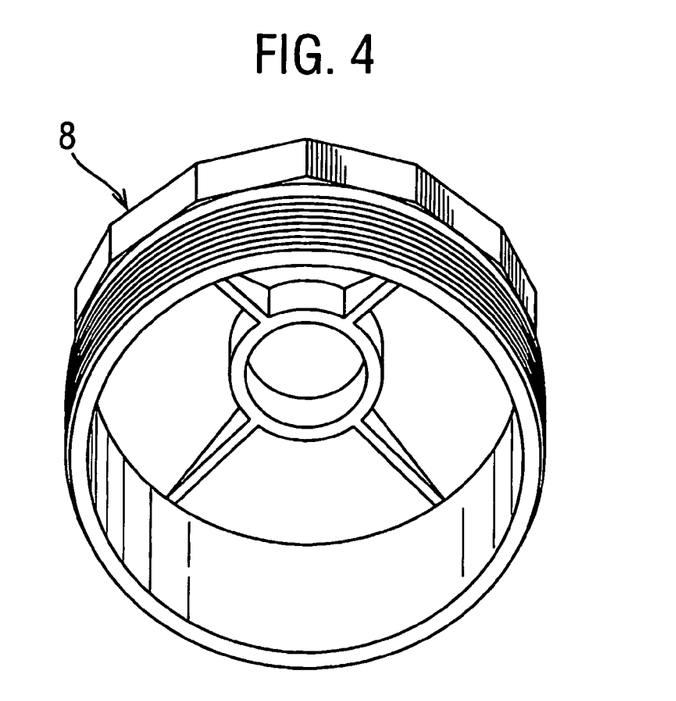
FIG. 4 is a perspective view showing the inside of a cap part of the filter shown in FIG. 1.
Figure 5:
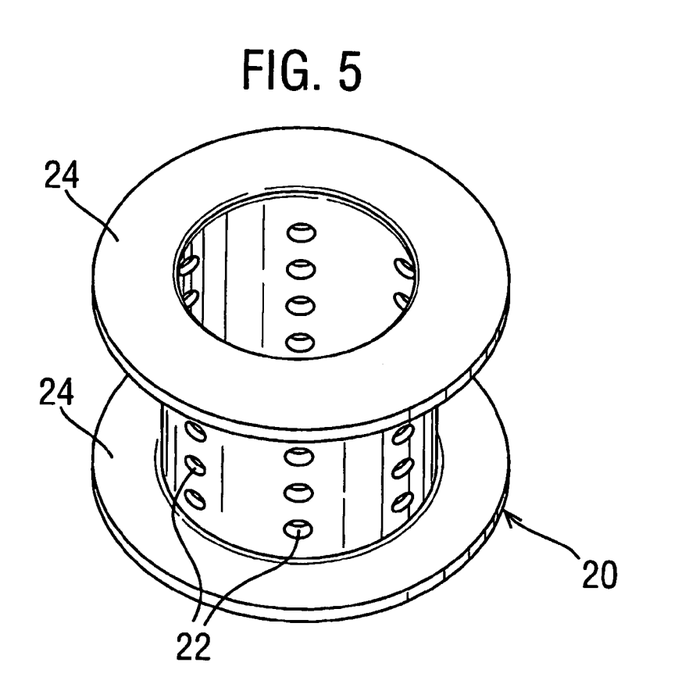
FIG. 5 is a perspective view of a support member forming part of the filter shown in FIG. 1.

The body 4 has a plurality of inlets 12 in the base 6 for enabling the oil to pass into the body 4. The body 4 has an outlet 14 in the base 6 for enabling the oil to pass out of the body 4.

The filter 2 comprises a filter material in the body 4. This filter material is for filtering the oil as the oil passes through the body 4. The filter material is such that it comprises activated carbon for removing the mutagens that are in the engine oil and that are created during use of the engine oil.

In FIG. 1, the activated carbon is shown as activated carbon 16 provided on a retainer material 18. The retainer material 18 is woven foam material which is in sheet form as shown and which has been wound around a support member 20 in the form of a spool. The support member 20 has a plurality of apertures 22 along its length for enabling the oil to pass through the support member 20. The retainer material 18 is wound around the outside of the support member as shown and it is retained in position by flanges 24, 26 on the support member 20.

Figure 6:
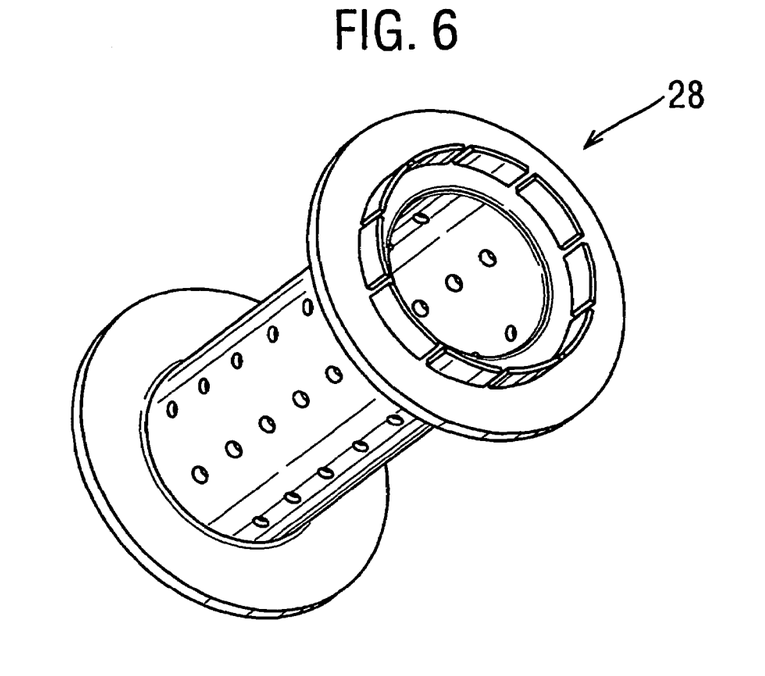
FIG. 6 is a perspective view of an alternative design of support member to that shown in FIG. 5 and for use in the different filter.
Figure 7:
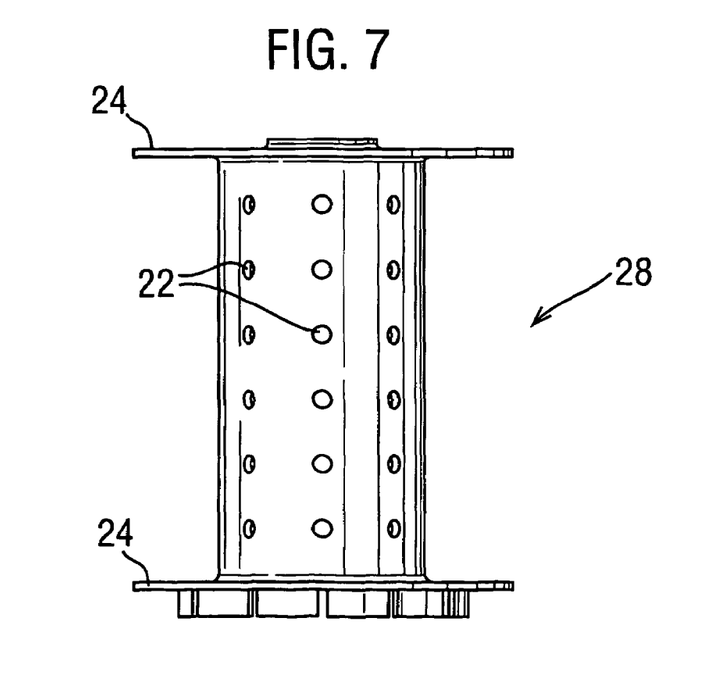
FIG. 7 is a side view of the support member shown in FIG. 6.

FIGS. 6 and 7 show an alternative support member 28 which may be used in an oil filter (not shown) and one having a longer body than the body 4 shown in FIG. 1. The support member 28 has apertures 22 and flanges 24, 26 in the same manner as the support member 20.

Figure 8:
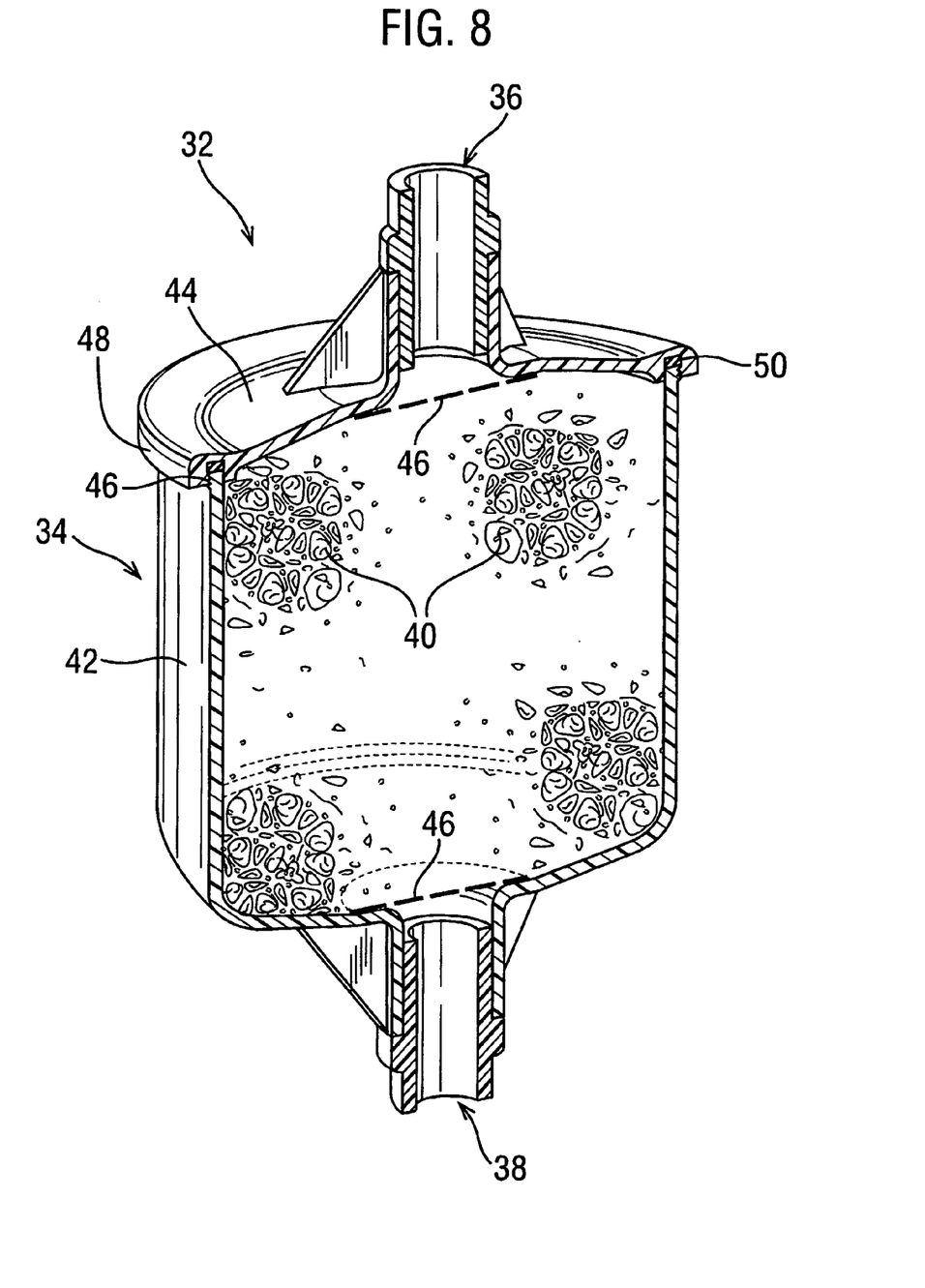
FIG. 8 is a cross section through a second filter.
Figure 9:
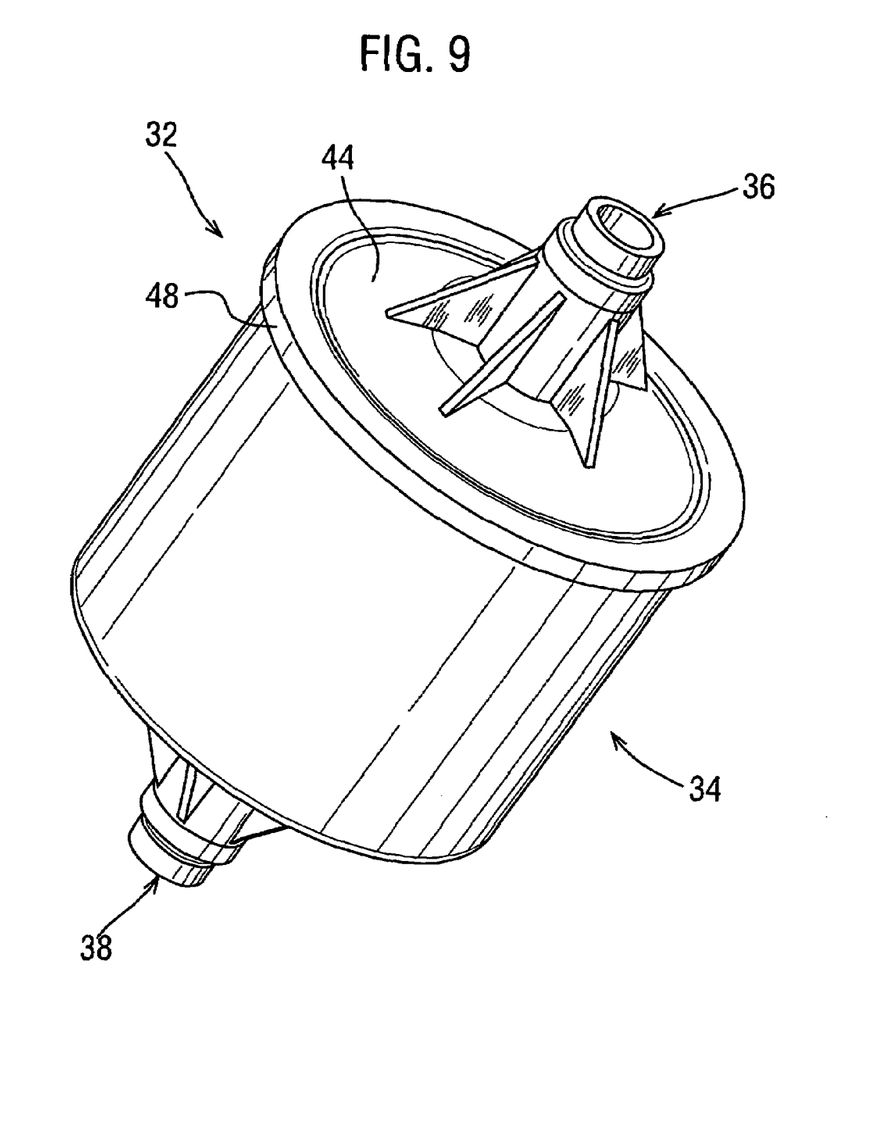
FIG. 9 is a perspective view of the filter shown in FIG. 8.

FIGS. 8 and 9 show a second filter 32 comprising a body 34, an inlet 36 for oil passing into the body 34, an outlet 38 for oil passing out of the body 34, and filter material 40 in the body 4 for filtering the oil as the oil passes through the body 34. The filter material 40 is such that it comprises activated carbon for removing the mutagens from the engine oil during use of the engine oil. The filter material 4 may be such that it comprises a woven polymer foam material, with the activated carbon in place. The foam material 40 is in small pieces as shown.

The body 34 is made of a plastics material. The body 34 comprises a main body part 42 and a cap part 44 which screws to the main body part 42 via screw threads 46. The cap part 44 has a grip portion 48 for helping the cap part 44 to be tightened and untightened from the main body part 42. An oil seal 50 is provided for preventing loss of oil from between the main body part 42 and the cap part 44 when the oil filter 32 is operating under hydraulic pressure. The main body part 42 and the cap part 44 may be made as mouldings, for example from glass reinforced nylon.

The oil filter 32 may include a non-return valve (not shown). Two screens 46 are positioned as shown in order to retain the pieces of the foam material 40 in the body 34.

Figure 10:
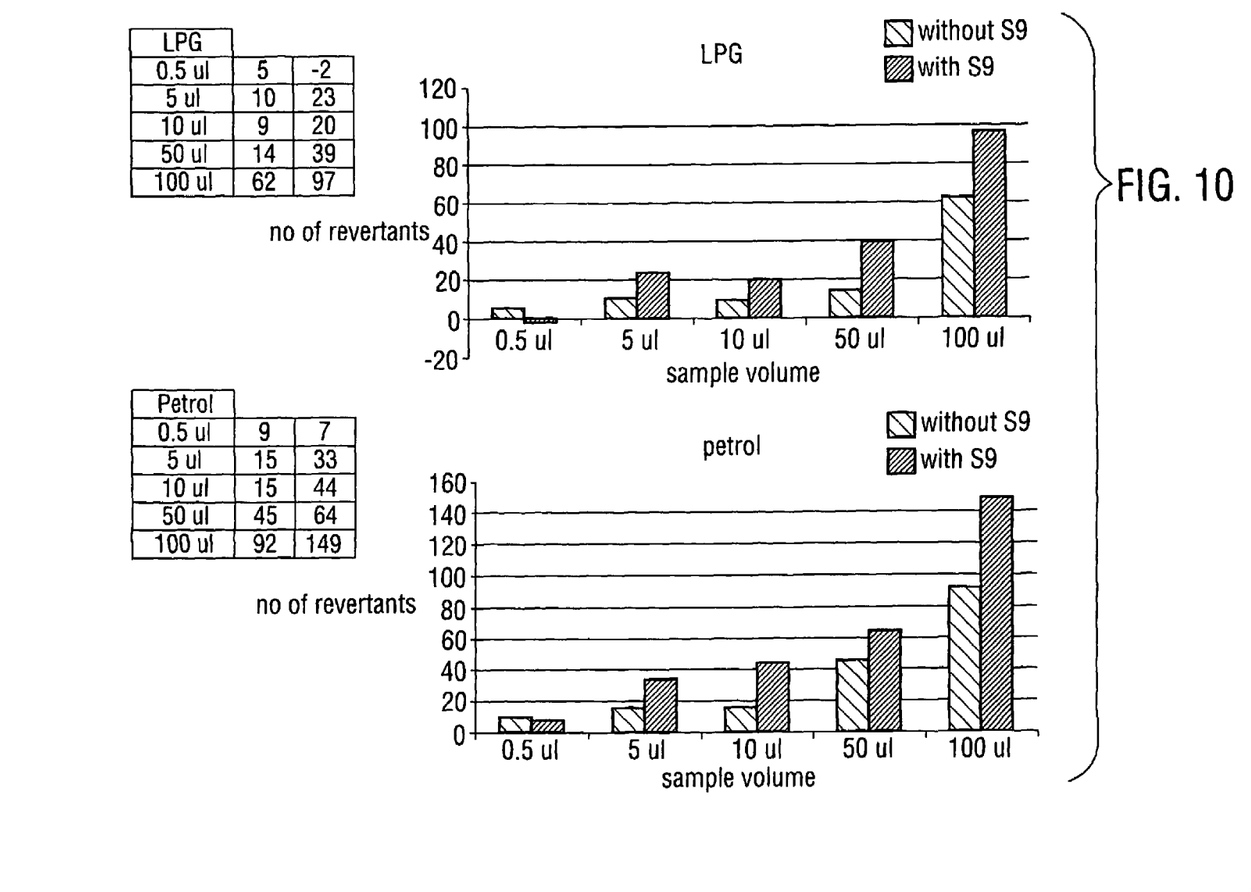
FIG. 10 shows two charts relating to the testing of liquid petroleum gas and petrol for mutagens after predetermined use periods.

Referring now to FIG. 10, there are shown two charts, one for liquid petroleum gas and the other for petrol. The two charts show the effect of activated charcoal on mutagenicity of engine oil.

Petrol engine oil is shown to be mutagenic in the presence and absence of liver S9 metabolic activation. The effect was tested of activated charcoal on the mutagencity of a petrol engine oil sample without the liver S9. Charcoal was mixed with the oil and DMSO (equal volumes) and after sedimenting the charcoal, 100 microliters of supernatant were tested. The results are given below.

| Sample | Number of revertants (mutagenicity) S. typh. TA98 |
| --- | --- |
| Negative control | 20, 23, 30 |
| Oil − charcoal treatment | 113, 100, 105 |
| Oil + charcoal treatment | 23, 26, 24 |

FIG. 10 illustrates the testing of two engine oil samples for mutagenicity in *Salmonella typhimurium* strain TA98 as DMSO/oil emulsions. Tests were in triplicate with a range of concentrations.

1. LPG with polymer, c.a. 4000 miles
2. Petrol with polymer, c.a. 2000 miles

Both samples gave a dose—response both with and without a metabolic activation system.

This indicates that both samples contained mutagens. The values were higher when a metabolic activation system was present.

Figure 11:
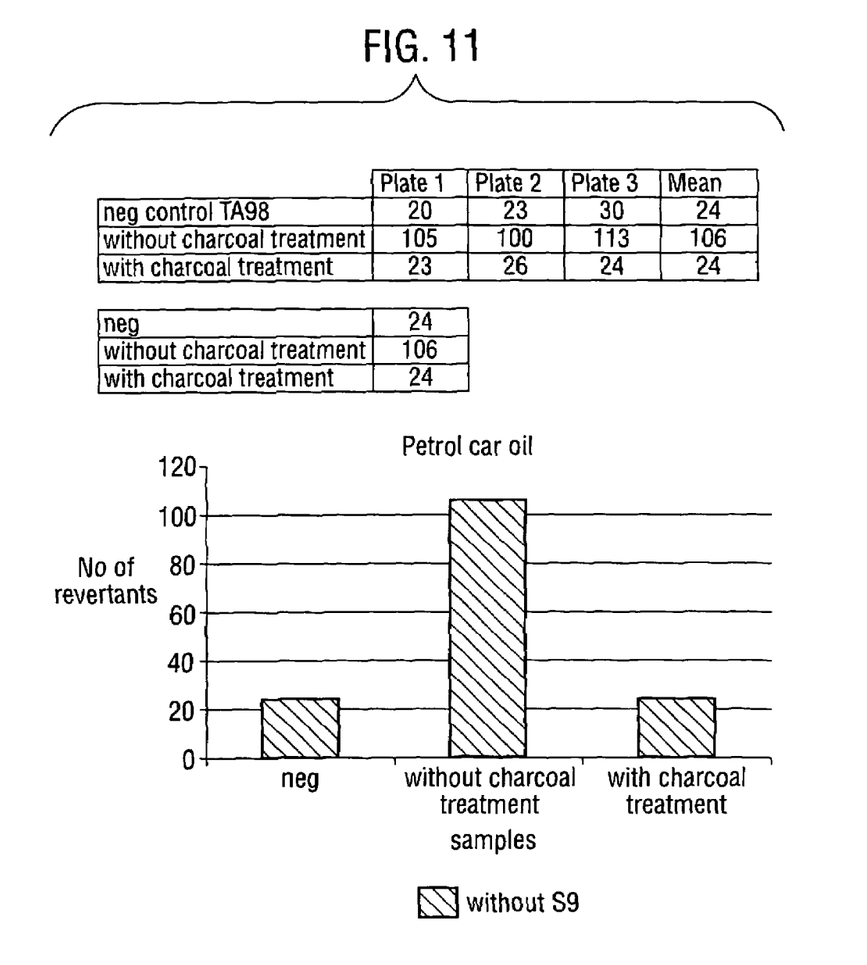
FIG. 11 shows a chart illustrating the advantages of the invention.

FIG. 11 shows a chart for a with-charcoal treatment and a without-charcoal treatment. The advantages of the use of charcoal can clearly be seen.

It is to be appreciated that the embodiments of the invention described above with reference to the accompanying drawings have been given by way of example only and that modifications may be effected. Thus, for example, the shape of the filters shown in the drawings may be varied. The filter of the present invention may be a special purpose filter just for filtering mutagens from an engine oil. Alternatively, the filter may be a multi-purpose filter for filtering the mutagens and other things from the engine oil. With such a multi-purpose filter, the filter may filter mutagens and general particles that are currently filtered with known filters. Alternatively, the multi-purpose filter may be for filtering the mutagens, and also the known particles/contaminants as are filtered in standard filters, and if desired, water from the oil if an appropriate water-absorbing material is employed. Such an appropriate water-absorbing material may be a woven foam material or a polymer material. One presently preferred such material is that manufactured by the Camelot Company of Canada. The foam material does not become wet in humid atmospheres and so there is no need to protect the foam material, for example by encapsulating it, from the effects of the atmosphere. Another presently preferred material is a polyacrylate super absorbent fibre material manufactured by Technical Absorbents Limited of Grimsby, United Kingdom under the name Oasis. A less preferred foam material which can be used and which is in fact hygroscopic is that sold under the trade mark Luquafleece by BASF Superabsorbents Ltd. of Birkenhead, United Kingdom.

The invention claimed is:

1. A filter for filtering mutagens from an engine oil, which filter comprises a body, an inlet for oil passing into the body, an outlet for oil passing out of the body, and a filter material in the body for filtering the oil as the oil passes through the body, and the filter material being such that it comprises activated carbon for removing the mutagens and a retainer material for retaining the activated carbon in place, the activated carbon is activated particulate carbon, the activated carbon is separate from and not integrally formed with the retainer material, the activated carbon has substantially its entire surface available for contact with the oil, the retainer material is an absorbent material, and the retainer material is in the form of a plurality of radially extending adjacent layers or pieces with the activated carbon between the layers or pieces wherein the activated carbon extends radially to a depth defined by the layers or pieces.

2. A filter according to claim 1 in which the activated carbon is 44 micron activated carbon.

3. A filter according to claim 1 in which the retainer material is a woven foam material.

4. A filter according to claim 1 in which the retainer material is a polymer foam material.

5. A filter accordingly to claim 1 in which the retainer material is an absorbent fibre material.

6. A filter according to claim 5 in which the absorbent fibre material is a polyacrylate super absorbent fibre material.

7. A filter according to claim 5 in which the absorbent fibre material is in the form of a non-woven material, a yarn material or a woven material.

8. A filter according to claim 1 in which the filter material forms part of a cartridge which is positioned in the body.

9. A filter according to claim 8 in which the cartridge includes a support member for the filter material.

10. A filter according to claim 9 in which the support member has a plurality of apertures along its length for enabling the oil to pass through the support member.

11. A filter according to claim 9 in which the filter material is positioned around the outside of the support member.

12. A filter according to claim 11 in which the filter material is in sheet form and is wrapped around the outside of the support member.

13. A filter according to claim 9 in which the filter material is positioned inside the support member.

14. A filter according to claim 13 in which the filter material is in sheet form or is the form of pieces.

15. A filter according to claim 14 and including end screen members for retaining the filter material in the support member.

16. A filter according to claim 1 and including a non-return valve.

17. A filter according to claim 16 in which the non-return valve is positioned in an end part of the filter.

18. A filter according to claim 1 in which the outlet is an internally threaded outlet for enabling the filter to be a screw threaded connection to an oil circuit.

* * * * *